US005905117A

United States Patent [19]

Yokotsuka et al.

[11] Patent Number: 5,905,117

[45] Date of Patent: May 18, 1999

[54] LOW DIELECTRIC RESIN COMPOSITION

[75] Inventors: Shunsuke Yokotsuka; Aya Serita; Ko Aosaki; Ikuo Matsukura, all of Yokohama; Takenori Narita; Hiroyuki Morishima, both of Hitachi; Shunichiro Uchimura, Hitachi, all of Japan

[73] Assignees: Asahi Glass Company Ltd.; Hitachi Chemical Co., Ltd., both of Tokyo, Japan

[21] Appl. No.: 08/716,065

[22] Filed: Sep. 19, 1996

[30] Foreign Application Priority Data

Sep. 21, 1995 [JP] Japan .................................... 7-243228

[51] Int. Cl.$^6$ ........................................................ C08F 8/42

[52] U.S. Cl. .......................... 525/104; 525/100; 525/106; 525/209; 438/758; 428/421; 428/422; 428/451; 428/447

[58] Field of Search .................................... 525/104, 106, 525/100, 209; 438/758; 428/421, 422, 451, 447

[56] References Cited

U.S. PATENT DOCUMENTS

| | | | |
|---|---|---|---|
| 4,861,667 | 8/1989 | Takayanagi et al. | 428/421 |
| 5,021,602 | 6/1991 | Clement et al. | 558/230 |
| 5,037,917 | 8/1991 | Babb et al. | 526/242 |
| 5,344,880 | 9/1994 | Nambu et al. | 525/100 |
| 5,360,869 | 11/1994 | DeSimone et al. | 525/10 |
| 5,510,406 | 4/1996 | Matsuo et al. | 524/237 |
| 5,639,825 | 6/1997 | Nanbu et al. | 525/100 |

FOREIGN PATENT DOCUMENTS

| | | |
|---|---|---|
| 0 727 817 | 8/1996 | European Pat. Off. . |
| 3-54279 | 3/1991 | Japan . |
| 5-263045 | 10/1993 | Japan . |
| 7-331178 | 12/1995 | Japan . |

OTHER PUBLICATIONS

Chemical Abstracts, vol. 122, No. 22, May 29, 1995, AN 267676, JP 06–322336, Nov. 22, 1994.

*Primary Examiner*—Margaret W. Glass
*Attorney, Agent, or Firm*—Oblon, Spivak, McClelland, Maier & Neustadt, P.C.

[57] ABSTRACT

A low dielectric resin composition comprising the following components (a) and (b), and the dielectric constant of a coating film formed by this composition being at most 3:

(a) a resin having functional groups in its molecule and being soluble in a solvent; and (b) a partially hydrolyzed condensate of alkoxysilanes of the formula $R^1{}_mR^2{}_nSi(OR^3)_{4-m-n}$, wherein each of $R^1$ and $R^2$ which may be the same or different, is a non-hydrolyzable group, $R^3$ is an alkyl group, and m and n are integers of from 0 to 3 satisfying $0 \leqq m+n \leqq 3$.

17 Claims, No Drawings

LOW DIELECTRIC RESIN COMPOSITION

The present invention relates to a low dielectric resin composition which is capable of forming a resin film with a low dielectric constant having improved mechanical properties at high temperatures.

In recent years, as miniaturization, high integration and high densification progress for semiconductor devices or multi-layered circuit boards, insulating materials having low dielectric constants have been desired which contribute to shortening the time of signal propagation delay. Presently widely used as a buffer coat film of a semiconductor device, a passivation film of a semiconductor device, an interlayer dielectric film of a semiconductor device, an α-ray shielding film of a semiconductor device or an interlayer dielectric film of a multi-layered circuit board, are a silicon oxide film, a silicon nitride film, a polyimide resin and the like, but their dielectric constants are at levels of from 4 to 5, from 7 to 9 and from 3.5 to 4, respectively. Thus, a material having a dielectric constant of at most 3, is desired.

Fluorine resins have not only low dielectric constants but excellent properties such as high heat resistance and high chemical resistance, and accordingly, their developments have been active.

In general, an aliphatic fluorine resin is insoluble in a solvent, whereby it has been difficult to form a thin film uniformly by coating. Whereas, as disclosed in Japanese Unexamined Patent Publications No. 238111/1988 and No. 260932/1988 and U.S. Pat. No. 4,754,009, fluorine resins (dielectric constant: 2.0–2.1) having aliphatic cyclic structures on their main chains, which are soluble in special fluorine-containing solvents, have been developed. Further, as disclosed in Japanese Unexamined Patent Publications No. 48579/1990 and No. 76644/1995, it is known that fluorine resins having carboxylic acid groups or sulfonic acid groups in their molecules, are soluble in solvents such as alcohols.

A fluorine resin having an aliphatic cyclic structure in its main chain has characteristics such that the dielectric constant is low, it has no water absorptivity, and a metal does not diffuse into it. European Patent 0393682 discloses its application to a protective film for a semiconductor device, and Japanese Unexamined Patent Publication No. 283827/1993 discloses its application to an insulating film for a multi-layered circuit board such as a multi chip module (MCM) by utilizing such characteristics.

As other fluorine resins having low dielectric constants, Japanese Unexamined Patent Publications No. 104129/1985 and No. 282874/1991 disclose fluorine-containing polyimide resins (dielectric constant: 2.2–2.8), U.S. Pat. No. 5,115,082 discloses fluorine-containing poly(arylene ether) resins (dielectric constant: 2.4–2.6), U.S. Pat. No. 5,364,917 discloses perfluorocyclobutane ring-containing resins (dielectric constant: 2.4–2.5), and U.S. Pat. No. 5,405,677 discloses fluorine-containing aromatic resins (dielectric constant: 2.1–2.5).

However, these fluorine resins usually have glass transition temperatures of from 50 to 250° C., and they are mechanically flexible particularly in a high temperature region, i.e. the modulus of elasticity is small, and the linear expansion coefficient is as large as from 50 to 100 ppm. A semiconductor device or a multi-layered circuit board is a composite with a wiring metal (linear expansion coefficient: about 20 ppm/°C.) or other inorganic insulating films (linear expansion coefficient: 0.5 to 5 ppm/°C.), and it is subjected to a high temperature of from 200 to 450° C. in its production and packaging processes. Accordingly, the low glass transition temperature, the small modulus of elasticity in a high temperature region and the high linear expansion coefficient of the fluorine resin, have been serious problems in an attempt to use such a fluorine resin for this application, with a view to preventing a decrease in the reliability of the device or the circuit board.

As disclosed, for example, in a collection of papers reported at Symposium for Semiconductors and Integrated Circuit Technology, pp66, vol.48 (1995), a resin having a glass transition temperature of about 350° C. has been developed by improving the molecular structure of the resin. However, with this resin, the modulus of elasticity decreases abruptly from a temperature of about 330° C., and the linear expansion coefficient is not improved at all at a level of from 70 to 80 ppm/°C. Therefore, a further improvement has been desired.

Further, a method of mixing an inorganic fine particulate powder is known as a method for improving the mechanical properties of a fluorine resin in Japanese Unexamined Patent Publication No. 259907/1988. However, by this method, it is extremely difficult to produce inorganic particles having a primary particle size of at most 0.1 μm, and even if the one having a small primary particle size is used, adhesion of particles to one another is likely to occur, whereby it has been practically difficult to form a uniform coating film having a thickness of from 0.1 μm to a few μm.

Further, Japanese Unexamined Patent Publication No. 112126/1995 discloses a solution composition wherein as a method of mixing finer inorganic particles to a fluorine resin, an organo sol of inorganic fine particles using a fluorine-containing solvent, is incorporated to a fluorine resin solution. However, to obtain a uniform solution by this method, surface treatment of the organo sol with a fluorine-containing surface treating agent is essential, and even if such surface treatment is carried out, the affinity of the fluorine resin and the inorganic component in the formed coating film is not necessarily adequate. Accordingly, there has been a problem such that the mechanical strength is small, and the inorganic component is likely to bleed out on the surface.

As materials having low dielectric constants other than fluorine resins, a polyquinoline resin (dielectric constant: 2.8), a poly(benzocyclobutene)resin (dielectric constant: 2.6) as disclosed in e.g. Journal of Electronic Materials, pp819, vol.23 (1994) and amorphous polyolefin resins (dielectric constant: 2.2 to 2.4) as disclosed in Electronics Packaging Technology pp.36, vol.11 (1995) have, for example, been developed. Like the above described fluorine resins, these resins also have problems that the modulus of elasticity is small particularly in a high temperature region, and the linear expansion coefficient is large, and an improvement has been desired in this connection.

Accordingly, it is an object of the present invention to provide a low dielectric resin composition useful as e.g. a coating composition capable of forming a uniform coating film by overcoming a drawback such that it is mechanically soft particularly at a high temperature i.e. the modulus of elasticity is small or the linear expansion coefficient is large, while maintaining excellent electrical properties of a resin having a low dielectric constant as far as possible.

The present invention provides a low dielectric resin composition comprising the following components (a) and (b), and the dielectric constant of a coating film formed by this composition being at most 3:

(a) a resin having functional groups in its molecule and being soluble in a solvent; and (b) a partially hydrolyzed condensate of alkoxysilanes of the formula $R^1{}_mR^2{}_nSi(OR^3)_{4-m-n}$, wherein each of $R^1$ and $R^2$ which may be the same or different, is a non-hydrolyzable group, $R^3$ is an alkyl group, and m and n are integers of from 0 to 3 satisfying $0 \leqq m+n \leqq 3$.

Now, the present invention will be described in detail with reference to the preferred embodiments.

A coating film formed by the resin composition of the present invention is a film having a dielectric constant of at most 3, wherein a cured product of the partially hydrolyzed condensate (b) of alkoxysilanes and the specific resin (a) are uniformly complexed. The resin (a) and the cured product of the partially hydrolyzed condensate (b) are, at least partially, cross-linked by a chemical reaction or hydrogen bonding directly or by means of a coupling agent (c) which will be described hereinafter.

With respect to semiconductor devices, miniaturization, high integration and high densification are in progress, and along with the progress, noises and delay in signal propagation attributable to insulation films such as interlayer dielectric films, passivation films, buffer coat films or α-ray shielding films, have become problems to be solved. To solve such problems, it is effective to apply a film having a low dielectric constant as the insulation film. For example, the dielectric constant required for the interlayer dielectric film is about 3 for a device of a design rule (the minimum size of a circuit) of 0.25 μm, about 2.8 for a device of a design rule of 0.18 μm, about 2.4 for a device of a design rule of 0.13 μm, and about 2.1 for a device of a design rule of 0.1 μm.

Also with respect to a circuit board such as a multi-layered circuit board, it has become necessary to reduce noises and delay in signal propagation attributable to an insulating film, along with the progress in miniaturization, high densification and high frequency of signals. Like in the case of semiconductor devices, it is effective to apply an insulating film having a low dielectric constant.

As a material having a low dielectric constant, a resin material such as a fluorine resin is available. However, in order to lower the dielectric constant, it is essentially required to have a characteristic such that polarization of molecules is small, or the density is small. However, such a characteristic tends to serve to minimize the interaction among resin molecules, whereby a resin having a low dielectric constant usually tends to be inferior in the mechanical properties such that the modulus of elasticity is small at a high temperature, or the linear expansion coefficient is large, which becomes a drawback when the resin is applied to a semiconductor device or a multi-layered circuit board.

A semiconductor device or a multi-layered circuit board is a composite with a wiring metal (linear expansion coefficient: about 20 ppm/°C.) and other inorganic insulating films (linear expansion coefficient: from about 0.5 to 5 ppm/°C.), and it is subjected to a high temperature of from 200 to 450° C. in its production process and in its packaging process. Accordingly, if the modulus of elasticity (the degree of deformation under load) of the insulating film at a temperature of at least 200° C., is small, deformation or flow of the film is likely to occur, whereby the production yield of the device or the multi-layered circuit board will decrease. Further, if the linear expansion coefficient of the insulating film is large, by a thermal stress due to disagreement with the linear expansion coefficient of the wiring metal or other inorganic insulating films, cracks are likely to form in the coating film, whereby the production yield is likely to decrease, or the reliability in the useful life of the semiconductor device or the multi-layered circuit board tends to decrease.

The present invention is intended to provide a low dielectric resin composition which is capable of forming a coating film which satisfies a dielectric constant of at most 3 which is indispensable to accomplish miniaturization, high densification and high integration, and a requirement of not impairing the production yield or the reliability in the useful life of the semiconductor device or the multi-layered circuit board, simultaneously. In the coating film formed by the resin composition of the present invention, the resin having a low dielectric constant and the cured product of the partially hydrolyzed condensate (b) are uniformly complexed, whereby the mechanical properties such as the linear expansion coefficient and the modulus of elasticity at a high temperature, can be improved while maintaining the electrical properties of the resin as far as possible.

The functional groups in the molecule of the resin (a) in the present invention, are preferably groups crosslinkable with the partially hydrolyzed condensate (b) or with the coupling agent (c) which will be described hereinafter.

The functional groups in the molecule of the resin (a) may, for example, be groups of carboxylic acid derivatives such as carboxylic acid ester groups or carboxylic acid amide groups, groups of sulfonic acid derivatives such as sulfonic acid ester groups or sulfonic acid amide groups, hydroxyl groups, carboxyl groups, sulfonic acid groups, nitrile groups, maleimide groups, amino groups, alkoxysilyl groups, or silanol groups. From the viewpoint of compatibility with the partially hydrolyzed condensate (b) in the present invention, the proportion of the functional groups in the resin (a) is preferably at least 1 μmol, more preferably from 1 to 10,000 μmol, most preferably from 1 to 3,000 μm, per g of the resin (a).

It is believed that these functional groups interact or react with the partially hydrolyzed condensate (b) or the after-mentioned coupling agent (c) in a solution, so that a uniform solution can be obtained, and consequently, a uniform coating film can be obtained. From the viewpoint of compatibility with the partially hydrolyzed condensate (b), the functional groups in the molecule of the resin (a) are preferably hydroxyl groups or carboxyl groups.

The resin (a) in the present invention is selected from those having the above-mentioned functional groups and low dielectric constants. In order to make the dielectric constant of the coating film formed by the coating composition of the present invention to a level of at most 3, the dielectric constant of the resin (a) is required to be at most 3, preferably at most 2.8. Further, the modulus of elasticity of the coating film formed by the coating composition of the present invention, at a temperature of at least 200° C., is at least the modulus of elasticity of the resin (a).

The weight average molecular weight of the resin (a) is not particularly limited, but it is preferably from 3,000 to 1,000,000, more preferably from 5,000 to 500,000. When the resin (a) is a fluorine resin, the fluorine content is preferably from 40 to 70 wt %, more preferably from 50 to 70 wt %.

As such a resin (a), the following resins (1) to (4) may, for example, be mentioned.

Among them, the resin (1) or (2) is preferred.

(1) A fluorine resin having functional groups in its molecule and a fluorine-containing aliphatic cyclic structure in its main chain;

(2) A fluorine resin having functional groups in its molecule and a fluorine-containing aliphatic structure in its main chain;

(3) A fluorine-containing condensed resin having functional groups in its molecule; and (4) A resin containing no fluorine, or a fluorine resin having functional groups in its molecule, other than the above resins (1) to (3).

Firstly, the fluorine resin (1) may, for example, be the one having functional groups introduced to a fluorine resin having a fluorine-containing aliphatic cyclic structure in its main chain, which is obtained by cyclic polymerization of a fluorine-containing monomer having at least two polymerizable double bonds, or obtained by polymerizing a monomer having a fluorine-containing aliphatic cyclic structure.

The expression "having a fluorine-containing aliphatic cyclic structure in its main chain" means a structure in which at least one carbon atom constituting the alicyclic ring is a carbon atom in the carbon chain constituting the main chain, and a fluorine atom or a fluorine-containing group is bonded to at least a part of the carbon atoms constituting the aliphatic ring.

The fluorine-containing monomer having at least two polymerizable double bonds may, for example, be a monomer of the following formula (e), (f), (g) or (h). In the formulas (e) to (h), each of $T^1$ to $T^{12}$, $Y^1$ to $Y^{10}$, $Z^1$ to $Z^8$ and $W^1$ to $W^8$, which are independent of one another, is F or $CF_3$.

The monomer having a fluorine-containing aliphatic cyclic structure may, for example, be a monomer of the following formula (i), (j) or (k). In the formulas (i) to (k), each of $X_1$ to $X^6$ which are independent of one another, is F or $CF_3$, and each of $R^4$ to $R^9$ which are independent of one another, is F, $C_nF_{2n+1}$ or $C_nF_{2n+1-p}H_pO_q$, wherein n is an integer of from 1 to 5, p is an integer of from 0 to 5, q is an integer of from 0 to 2, or, $R^4$ and $R^5$, $R^6$ and $R^7$, or $R^8$ and $R^9$, may bond to each other to form a ring.

(e) $CT^1T^2{=}CT^3CT^4T^5CT^6T^7CT^8T^9CT^{10}{=}CT^{11}T^{12}$ (f) $CY^1Y^2{=}CY^3OCY^4Y^5CY^6Y^7CY^8{=}CY^9Y^{10}$ (g) $CZ^1Z^2{=}CZ^3OCZ^4Z^5CZ^6{=}CZ^7Z^8$ (h) $CW^1W^2{=}CW^3OCW^4W^5OCW^6{=}CW^7W^8$

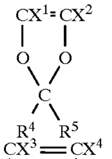
(i)

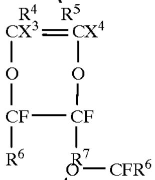
(j)

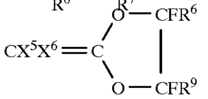
(k)

The fluorine resin having an aliphatic cyclic structure in its main chain, which is obtained by cyclic polymerization of a fluorine-containing monomer having at least two polymerizable double bonds, is known, for example, in Japanese Unexamined Patent Publication No. 238111/988, No. 238115/1988 or No. 316235/1995. Namely, it can be obtained by homopolymerization of a monomer such as perfluoro(allylvinylether), perfluoro(butenylvinylether) or perfluoro(bisvinyloxymethane) or its copolymerization with a radical polymerizable monomer.

The radical polymerizable monomer may, for example, be at least one member selected from the group consisting of olefins such as ethylene, perfluoroolefins such as tetrafluoroethylene and hexafluoropropylene, and perfluoro (alkylvinylethers) such as perfluoro(butylvinylether).

The fluorine resin having an aliphatic cyclic structure in its main chain, which is obtained by polymerization of a monomer having a fluorine-containing aliphatic cyclic structure, is known, for example, in Japanese Examined Patent Publication No. 18964/1988 or Japanese Unexamined Patent Publication No. 70107/1995. Namely, it can be obtained by homopolymerization of a monomer having a fluorine-containing cyclic structure, such as perfluoro(2,2-dimethyl-1,3-dioxole) or 2,2,4-trifluoro-5-trifluoromethoxy-1,3-dioxole, or its copolymerization with the above-mentioned radical polymerizable monomer.

Further, it may be a fluorine resin obtained by copolymerizing a monomer having a fluorine-containing aliphatic cyclic structure, such as perfluoro(2,2-dimethyl-1,3-dioxole) or 2,2,4-trifluoro-5-trifluoromethoxy-1,3-dioxole, with a fluorine-containing monomer having at least two polymerizable double bonds, such as perfluoro(allylvinylether), perfluoro(butenylvinylether) or perfluoro (bisvinyloxymethane).

The fluorine resin having a fluorine-containing aliphatic cyclic structure in its main chain is preferably the one containing 20 to 100 mol % of the fluorine-containing aliphatic cyclic structure in the repeating units of the fluorine resin, in view of the transparency, mechanical properties, etc.

The following methods 1) to 11) are preferred as methods for introducing functional groups for the above fluorine resin (1).

1) A method of introducing carboxyl groups to the terminals of a fluorine resin by carrying out the polymerization in the presence of an initiator or a chain transfer agent having a functional group such as a carboxyl group, or its precursor group such as an acyl group, in its molecule.

2) A method of introducing sulfonic acid groups to the terminals of a fluorine resin by carrying out the polymerization in the presence of an initiator or a chain transfer agent having a functional group such as a sulfonic acid group, or its precursor group, in its molecule.

3) A method in which a fluorine resin is subjected to high temperature treatment in the presence of an oxygen to oxidize and decompose side chains or terminals of the fluorine resin, followed by water treatment to introduce carboxyl groups thereto.

4) A method of introducing carboxylic acid derivative groups to side chains of a fluorine resin by copolymerizing a monomer having a carboxylic acid derivative group such as methyl perfluoro(5-oxa-6-heptenoate).

5) A method of introducing sulfonic acid derivative groups to side chains of a fluorine resin by copolymerizing a monomer having a sulfonic acid derivative group, such as perfluoro(3,5-dioxa-4-methyl-7-octenesulfinyl)fluoride.

6) A method wherein carboxylic acid derivative groups are hydrolyzed to carboxyl groups, carboxylic acid derivative groups are reduced to hydroxyl groups, and carboxylic acid derivative groups and amines are reacted to form carboxylic acid amide groups.

7) A method wherein carboxyl groups are reduced to hydroxyl groups, and carboxyl groups and amines are reacted to form carboxylic acid amide groups.

8) A method wherein carboxylic acid derivative groups are reacted with ammonia, followed by dehydration to form nitrile groups.

9) A method wherein sulfonic acid derivative groups are hydrolyzed to sulfonic acid groups.

10) A method wherein amines are reacted to sulfonic acid derivative groups or sulfonic acid groups to form sulfonic acid amide groups.

11) A method of introducing alkoxysilyl groups or silanol groups by reacting a silane coupling agent or the like to carboxyl groups or hydroxyl groups.

Secondly, the fluorine resin (2) may, for example, be a copolymer of tetrafluoroethylene with a monomer having a carboxylic acid derivative group or a sulfonic acid derivative group such as methyl perfluoro(5-oxa-6-heptenoate), perfluoro(4,7-dioxa-5-methyl-8-nonenoate or perfluoro(3,5-dioxa-4-methyl-7-octenesulfinyl)fluoride, or a copolymer of tetrafluoroethylene with the above-mentioned monomer having a carboxylic acid derivative group or a sulfonic acid derivative group and a monomer selected from e.g. ethylene, hexafluoropropylene and a perfluoro(alkylvinylether). By means of carboxylic acid derivative groups or sulfonic acid derivative groups in such fluorine resins (2), carboxyl groups, hydroxyl groups, carboxylic acid amide groups, nitrile groups, sulfonic acid amide groups, alkoxysilyl groups or silanol groups may, for example, be introduced in the same manner as the above-mentioned methods 6) to 11) for introducing functional groups.

The fluorine-containing condensed resin (3) may, for example, be fluorine-containing polyimide resins disclosed in e.g. Japanese Unexamined Patent Publications No. 104129/1985 and No. 282875/1991 or fluorine-containing poly(arylene ether) resins disclosed in e.g. U.S. Pat. No. 5,115,082.

The resin containing no fluorine, or the fluorine resin (4), may, for example, be polyquinoline resins, poly (benzocyclobutene)resins as disclosed in e.g. Journal of Electronic Materials, pp819, vol.23 (1994), amorphous polyolefin resins as disclosed in e.g. Electronics Packaging Technology pp.36, vol.11 (1995), perfluorocyclobutane ring-containing resins as disclosed in U.S. Pat. No. 5,364,917, and fluorine-containing aromatic resins as disclosed in U.S. Pat. No. 5,405,677.

A method for introducing functional groups to the resins (3) and (4), may, for example, be a method of using terminal groups or a method of copolymerizing a functional group-containing component, in the same manner as for the resin (1).

The coating composition of the present invention comprises the above-mentioned resin (a) having functional groups in its molecule and a partially hydrolyzed condensate (b) of alkoxysilanes of the formula $R^1_mR^2_nSi(OR^3)_{4-(m-n)}$, wherein each of $R^1$ and $R^2$ which may be the same or different, is a non-hydrolyzable group, $R^3$ is an alkyl group, and m and n are integers satisfying $0 \leqq m+n \leqq 3$, as essential components.

In the formula, the non-hydrolyzable group is selected from $C_{1-14}$ non-hydrolyzable groups, since they are readily available. The non-hydrolyzable group may have a functional group which is crosslinkable with the resin (a) or with the coupling agent which will be described hereinafter.

The non-hydrolyzable group may preferably be, for example, an organic group having a reactive group such as a γ-glycidoxyproply group, a γ-aminopropyl group, an aminophenyl group or an N-phenyl-γ-aminopropyl group, an alkyl group such as a methyl group, an ethyl group, a propyl group or a butyl group, an alkenyl group such as a vinyl group, an aryl group such as a phenyl group or a tolyl group, or a fluorine-containing alkyl group such as a trifluoromethyl group, a trifluoropropyl group, a pentafluorobutyl group, a nonafluorohexyl group, a tridecafluorooctyl group, a heptadecafluorodecyl group or a heptadecafluoroundecyl group.

A fluorine-containing alkyl group having fluorine atoms and hydrogen atoms, such as a trifluoropropyl group, is preferred, since a compound having a perfluoroalkyl group at a terminal of an alkyl group, such as a 3,3,3-trifluoropropyl group, is readily available. Accordingly, the fluorine-containing alkyl groups in the fluorine-containing alkoxysilanes which will be described hereinafter, are preferable selected from such fluorine-containing alkyl groups.

$R^3$ in the formula is preferably a $C_{1-8}$ alkyl group, since such a group is readily partially hydrolyzable. More preferably, it is a $C_{1-4}$ alkyl group such as a methyl group, an ethyl group, a propyl group or a butyl group.

The partially hydrolyzed condensate (b) in the present invention may be a partially hydrolyzed condensate made solely of one member selected from the those of the formula wherein m=n=0, m+n=1, m+n=2 and m+n=3, or a partially hydrolyzed condensate made of two or more members selected from them.

However, alkoxysilanes wherein m+n=3, of course, have only one hydrolyzable group in their molecules, and as such, can not form partially hydrolyzed condensates alone. Accordingly, alkoxysilanes wherein m+n=3 are used in combination with alkoxysilanes wherein m=n=0, m+n=1, or m+n=2, for the purpose of suppressing an excessive reaction of the partially hydrolyzed condensate of alkoxysilanes in the solution. The alkoxysilane wherein m+n=3 are preferably at most 10 mol %, based on the total alkoxysilanes.

A partially hydrolyzed condensate made solely of an alkoxysilane wherein m+n=2, forms a linear condensate and can not take a three dimensional structure, whereby it is not so effective to improve the mechanical properties at a high temperature of the resin. Accordingly, the alkoxysilane wherein m+n=2 is preferably employed in combination with an alkoxysilane wherein m=n=0 or m+n=1. The alkoxysilane wherein m+n=2 is preferably at most 30 mol % based on the total alkoxysilanes.

Preferred examples of such alkoxysilanes include tetraalkoxysilanes such as tetramethoxysilane, tetraethoxysilane and tetrapropoxysilane, monoalkyltrialkoxysilanes such as methyltrimethoxysilane, methyltriethoxysilane and phenyltrimethoxysilane, monoalkenyltrialkoxysilanes such as vinyltrimethoxysilane and vinyltriethoxysilane, fluorine-containing alkoxysilanes such as trifluoromethyltrimethoxysilane, trifluoropropyl- trimethoxysilane, pentafluorobutyl- trimethoxysilane, nonafluorohexyltrimethoxysilane, tridecafluorooctyl- trimethoxysilane, heptadecafluorodecy- 1-trimethoxysilane, heptadecafluorodecylmethyldimethoxysilane, heptadecafluoroundecyltrimethoxysilane, (4-perfluorobutylphenyl)trimethoxysilane, (4-perfluorohexylphenyl)trimethoxysilane and (4-perfluorooctylphenyl)trimethoxysilane, epoxysilanes such as γ-glycidoxypropyltrimethoxysilane and γ-glycidoxypropyltriethoxysilane, fatty acid aminosilanes such as γ-aminopropylmethyldiethoxysilane and γ-aminopropylethoxysilane, and aromatic ring-containing aminosilanes such as aminophenyltrimethoxysilane, aminophenyltriethoxysilane and N-phenyl-γ-aminopropyltrimethoxysilane. These alkoxysilanes may be used alone or in combination as a mixture of two or more of them. Among these alkoxysilanes, fluorine-containing alkoxysilanes have high compatibility with the fluorine resin, and tetraalkoxysilanes are suitable particularly for the improvement of the mechanical strength at a high temperature, since they will be inorganic if the hydrolytic condensation reaction is completely carried out. For the same reason, preferred is a partially hydrolyzed co-condensate of tetraalkoxysilanes and fluorine-containing alkoxysilanes.

Accordingly, when a fluorine resin is used as the resin having a low dielectric constant, from the viewpoint of compatibility with the resin and the improvement of the mechanical strength at a high temperature, it is effective to employ the two types of alkoxysilanes in combination. Particularly preferred is a case wherein the proportion of a partially hydrolyzed condensate comprising at least 0.2 mol of fluoroalkylsilanes per mol of tetraalkoxysilanes, is at least 90 wt % of the partially hydrolyzed condensate (b).

Here, fluorine-containing alkoxysilanes mean compounds having a fluorine atom or fluorine atoms bonded to at least one group selected from $R^1$ and $R^2$ of the alkoxysilanes of the above-mentioned formula.

The condensation reaction of alkoxysilanes can be carried out by a known or well-known methods. For example, a method may be mentioned wherein the alkoxysilanes are subjected to a hydrolytic condensation reaction by an addition of water in the presence of a solvent and a catalyst. In such a case, heating may be carried out, as the case requires. As the catalyst, an inorganic acid such as hydrochloric acid, nitric acid or sulfuric acid, or an organic acid such as forming acid, oxalic acid or acetic acid, can be used. It is usually preferred to set the molecular weight of the product within a range of from 500 to 10,000 as a weight average molecular weight calculated as polystyrene, obtained by gel permeation chromatography (GPC), from the viewpoint of the compatibility with the resin and the solubility in a solvent, which will be described hereinafter. Then, if necessary, water present in the system may be removed by e.g. distillation, and the catalyst may further be removed by e.g. an ion exchange resin.

In the present invention, it is important to select a solvent which is capable of dissolving the resin (a) and the partially hydrolyzed condensate (b) simultaneously, when a mixed solution of the resin (a) and the partially hydrolyzed condensate (b) is to be prepared.

When the resin (a) is the above-mentioned fluorine resin (1) having a fluorine-containing aliphatic cyclic structure in its main chain, a mixture of an aprotic fluorine-containing solvent and a protic fluorine-containing solvent, as disclosed in e.g. Japanese Unexamined Patent Publication No. 112126/1995, may, for example, be mentioned. Here, a feature is that the fluorine resin having a fluorine-containing aliphatic cyclic structure in its main chain dissolves in the aprotic fluorine-containing solvent but does not dissolve in the protic fluorine-containing solvent, and inversely, the partially hydrolyzed condensate (b) dissolves in the protic fluorine-containing solvent, but does not dissolve in the aprotic fluorine-containing solvent. Accordingly, by using the solvent mixture, both materials can be dissolved simultaneously.

The aprotic fluorine-containing solvent is a fluorine-containing solvent which does not dissociate or produce protons under a usual reaction condition, and a known or well-known aprotic fluorine-containing solvent may be employed. It may, for example, be a fluorine-containing aliphatic hydrocarbon such as perfluorohexane, perfluorooctane, 1H,1H,1H,2H,2H-perfluorooctane[$F(CF_2)_6C_2H_5$], or 1H,1H,1H,2H,2H-perfluorodecane[$F(CF_2)_6C_2H_5$], a fluorine-containing alicyclic hydrocarbon such as perfluorodecalin, perfluorocyclohexane or perfluoro(1,2-dimethylcyclobutane), a fluorine-containing alkylamine such as perfluorotripentylamine, perfluorotributylamine or perfluorotripropylamine, a fluoroether such as $HCF_2CF_2OCH_2CF_3$, or a fluorine-containing cyclic ether such as perfluoro(2-butyltetrahydrofuran). These solvents may be used alone or in combination as a mixture of two or more of them.

The protic fluorine-containing solvent is a fluorine-containing solvent which dissociates to form protons, and a known or well-known protic fluorine-containing solvent may be employed. It may, for example, be a fluorine-containing alcohol such as $CF_3CH_2OH$, $CF_3CF_2CH_2OH$, $CF_3(CF_2)_3CH_2CH_2OH$, $CF_3(CF_2)_5CH_2CH_2OH$, $CF_3CF_2CH_2CH_2CH_2OH$, or $CF_3(CF_2)_3CH_2CH_2CH_2OH$. These alcohols may be used alone or in combination as a mixture of two or more of them.

The mixing ratio of the aprotic fluorine-containing solvent and the protic fluorine-containing solvent is selected so that both the fluorine resin and the partially hydrolyzed condensate will be dissolved therein. The fluorine resin has functional groups, and accordingly the compatibility of the fluorine resin with the partially hydrolyzed condensate in the solution is high, thus leading to a feature that a uniform solution of both materials can be obtained.

Further, in a case where the partially hydrolyzed condensate of alkoxysilanes contains a partially hydrolyzed condensate of fluorine-containing alkoxysilanes, it may be dissolved in an aprotic fluorine-containing solvent depending upon its composition. In such a case, a uniform mixed solution can be prepared without addition or with addition of a small amount of such a protic fluorine-containing solvent.

In a case where the resin (a) is the above-mentioned fluorine resin (2) having a fluorine-containing aliphatic structure in its main chain, the solvent may be a solvent mixture of water with a hydrophilic organic solvent such as an alcohol, a ketone, an organic acid, an aldehyde or an amine, as disclosed in Japanese Unexamined Patent Publication No. 48579/1990, or a solvent mixture of an oxygen-containing hydrocarbon solvent and a fluorine-containing compound solvent, as disclosed in Japanese Unexamined Patent Publication No. 76644/1995.

The oxygen-containing hydrocarbon solvent may, for example, be an alcohol such as methanol, ethanol, propanol or butanol, an ether such as ethylene glycol monoethyl ether or ethylene glycol monomethyl ether, or a sulfoxide such as dimethylsulfoxide.

The fluorine-containing compound solvent may, for example, be the above-mentioned aprotic fluorine-containing solvent or the protic fluorine-containing solvent.

In a case where the resin (a) is the above-mentioned resin (3) or (4), a known or well-known solvent suitable for such a resin, may be employed. It may, for example, be N-methylpyrrolidone, N,N-dimethylformamide, xylene, tetrahydrofuran, a ketone or a lactone.

A method for preparing the mixed solution of the resin (a) and the partially hydrolyzed condensate (b) is not particularly limited so long as a uniform solution can thereby be prepared. The following methods (1) to (3) may, for example, be mentioned.

(1) A method wherein a solution of the partially hydrolyzed condensate (b) and a solution of the resin (a) are separately prepared beforehand, and the two solutions are mixed. In such a case, the solution of the partially hydrolyzed condensate (b) may be prepared directly in a solution which is compatible with the solution of the resin (a). Otherwise, it may be prepared in a solvent not compatible with the solution of the resin (a), and then by a conventional solvent-substitution method, the solution is converted to a solution with a compatible solvent. The latter case is used, for example, when the hydrolytic condensation reaction of alkoxysilanes will not adequately proceed in a solvent which is compatible with the solution of the resin (a), or when it is difficult to control the degree of polymerization of the condensate.

(2) A method wherein alkoxysilanes are dissolved in a solution of the resin (a), which has been prepared beforehand, and the partial hydrolytic condensation reaction is carried out in that solution.

(3) A method wherein a solution of the partially hydrolyzed condensate (b) is prepared beforehand, and the resin (a) is added and dissolved therein.

The compositional proportions of the resin (a) and the partially hydrolyzed condensate (b) can be set at optional levels depending upon the particular purpose. Usually, it is preferred to blend the partially hydrolyzed condensate (b) in an amount of from 3 to 400 parts by weight, particularly preferably from 10 to 150 parts by weight, per 100 parts by weight of the resin (a). If the proportion of the partially hydrolyzed condensate (b) is too small, the mechanical properties can not adequately be improved, and if it is too large, the properties inherent to the resin such as electrical properties and low water absorptivity, are likely to be impaired.

It is preferred that a crosslinking reaction takes place between the resin (a) and the partially hydrolyzed condensate (b), since the compatibility with the resin (a) with the partially hydrolyzed condensate (b) will thereby be improved, and the phase separation of a coating film will be suppressed, whereby the mechanical strength at a high temperature will further be improved. The crosslinking reaction between the resin (a) and the partially hydrolyzed condensate (b) may take place in the state of the solution or during the step of forming the coating film. However, it is preferred that the crosslinking reaction partially takes place in the state of the solution, since the compatibility of the resin (a) with the partially hydrolyzed condensate (b) will thereby be improved. Therefore, the solution may be stirred under heating as the case requires, so that the reaction takes place during the preparation of the solution.

As a method for carrying out the crosslinking reaction between the resin (a) and the partially hydrolyzed condensate (b), the following method (1) or (2) may, for example, be mentioned. Preferred is the method (2).

(1) A method wherein the functional groups of the resin (a) are directly reacted for crosslinking with the partially hydrolyzed condensate (b).

(2) A method wherein the functional groups of the resin (a) and the partially hydrolyzed condensate (b) are reacted for crosslinking via a coupling agent (c).

The coupling agent in the present invention is a compound such as a silicon compound, a titanium compound or an aluminum compound, which has a hydrolyzable group (a moiety reactive with the partially hydrolyzed condensate (b)) and a non-hydrolyzable group, and which also has a moiety reactive with the functional groups of the resin (a).

The non-hydrolyzable group is bonded to a silicon atom, a titanium atom or an aluminum atom through its terminal carbon atom. At least one non-hydrolyzable group has a moiety reactive with the functional group of the resin (a).

The hydrolyzable group may, for example, be an alkoxy group, an alkoxyalkoxy group, an acyloxy group, an aryloxy group, an aminoxy group, an amide group, a ketoxime group, an isocyanate group or a halogen atom. Preferred is a group having a hydrogen atom removed from a hydroxyl group of a monovalent alcohol, such as an alkoxy group or an alkoxyalkoxy group. Particularly preferred is an alkoxy group, and its carbon number is at most 8, preferably from 1 to 4.

The moiety reactive with the functional group of the resin (a) is preferably an amino group or an epoxy group, and such a group is usually contained in the above non-hydrolyzable group.

The coupling agent (c) is preferably a silane coupling agent, a titanate coupling agent, or an aluminum coupling agent. This silane coupling agent is different from the component (b) in the coating composition of the present invention, in that it is not a partially hydrolyzed condensate.

The method (1) may, for example, be applied to a case where the functional groups of the resin (a) are carboxyl groups, and the partially hydrolyzed condensate (b) has an amino group, or a case where the functional groups of the resin (a) are alkoxysilyl groups or silanol groups.

The method (2) may, for example, be applied to a case where the functional groups of the resin (a) are carboxyl groups, and a silane coupling agent, a titanate coupling agent or an aluminum coupling agent having a functional group capable of bonding to a carboxyl group, is added as the coupling agent (c). As such a coupling agent (c), silane coupling agents such as epoxysilanes or aminosilanes are preferably employed. More preferably, aminosilanes are employed from the viewpoint of the reactivity with carboxyl groups and the moisture resistance and durability of the bond.

The aminosilanes may, for example, be aliphatic aminosilanes such as γ-aminopropylmethyldiethoxysilane, and γ-aminopropyltriethoxysilane, or aromatic ring-containing aminosilanes such as aminophenyltrimethoxysilane, aminophenyltriethoxysilane, and N-phenyl-γ-aminopropyltrimethoxysilane. Particularly preferred are the aromatic ring-containing aminosilanes, since they have high heat resistance.

When aminosilanes are used in the above methods (1) and (2), if the amount is too much, the viscosity stability of the liquid deteriorates, and the electric properties of the coating film tend to be impaired, and the mechanical properties of the coating film at a high temperature will not be improved if the amount exceeds a certain level. Accordingly, the amount of an aminosilane is preferably from 0.1 to 10 mol per mol of the carboxylic acid group.

Further, in a case where the viscosity stability decreases upon addition of an aminosilane, a silane having a function group which can be converted to an amino group, may be employed in order to improve the viscosity stability. A silane having an imino group will not function as an aminosilane by itself. When reacted with water, it decomposes into a ketone and an aminosilane. Accordingly, by controlling the amount of water in the solution, an excessive reaction in the solution can be suppressed.

Further, there may be a case wherein irrespective of the presence or absence of aminosilanes, in the mixed solution of the resin (a) and the partially hydrolyzed condensate (b), the hydrolyzed condensate undergoes a condensation reaction as time passes, whereby the viscosity stability is poor. In such a case, the viscosity stability tends to be improved if a tetraalkoxysilane such as tetramethoxysilane or tetraethoxysilane, or an alkylalkoxysilane such as methyltrimethoxysilane, methyltriethoxysilane, dimethyldimethoxysilane or trimethylmethoxysilane, is present in the solution, and this is preferably employed as a method for improving the pot life.

The solid content concentration in the solution, as the sum of the resin (a) and the partially hydrolyzed condensate (b), may suitably be selected from the viewpoint of the desired viscosity of the solution or the film thickness of the coating film, within the range where the solid content dissolves. For example, in a case where a coating film having a film thickness of from 0.1 to 5 μm is to be formed by a spin coating method, the solid content concentration may usually be set within a range of from 1 to 15 wt %.

To the low dielectric resin composition of the present invention, an additive such as a adhesion-improving agent or a surfactant may, for example, be incorporated as the case requires. Especially, it is preferred to incorporate an adhesion-improving agent reactive with the functional groups in the resin (a) or with the alkoxysilyl group or the silanol group of the partially hydrolyzed condensate (b), whereby the adhesion to the substrate will be improved, or the strength of the coating film will be improved.

As a method for forming a coating film on an article by the resin composition of the present invention, it is preferred to employ a method wherein the resin composition of the present invention containing a solvent is coated on the article, followed by heating and drying to evaporate the solvent. Here, to secure adequate adhesion to the substrate, the surface of the substrate may be pre-treated with a compound having both a moiety reactive with the functional groups of the resin (a) and/or the partially hydrolyzed condensate (b) and a moiety capable of bonding to the substrate surface.

The method for coating the composition of the present invention may, for example, be a spin coating method, a dipping method, a potting method, a die coating method or a spray coating method, and the coating method may suitably be selected depending upon the shape of the article to be coated, the required film thickness, etc. When the composition of the present invention is to be applied to a buffer coat film for a semiconductor device, a passivation film for a semiconductor device, an interlayer dielectric film for a semiconductor device or an $\alpha$-ray shielding film for a semiconductor device, a spin coating method is preferred, since the in-plane distribution of the film thickness will thereby be uniform. When it is applied to an interlayer dielectric film for a multi-layered circuit board, a die coating method as well as a spin coating method, is preferred as a method whereby high liquid yield is obtainable.

To form a coating film, a baking step is required after coating, to evaporate the solvent and to cure the partially hydrolyzed condensate of alkoxysilanes. The baking condition may suitably be selected depending upon e.g. the coating film thickness. For a sufficient curing reaction, a final baking at a temperature of from 200 to 450° C. is usually required. To sufficiently cure the partially hydrolyzed condensate of alkoxysilanes and to ensure that unreacted alkoxysilyl groups or silanol groups will not remain, a final baking at a temperature of preferably from 300 to 450° C., more preferably from 320 to 450° C., is required. Unreacted alkoxysilyl groups or silanol groups will be a factor for increasing the dielectric constant of the coating film by themselves, and they may further be a water absorbing site, which causes an increase of the dielectric constant by water. Accordingly, it is advisable not to let them remain in the coating film as far as possible.

For the purpose of securing the surface smoothness of the coating film or improving a fine space filling property of the coating film, it is possible to add a prebaking step at a temperature of from 50 to 250° C. or to carry out the baking step in a plurality of stages.

Further, depending upon the particular purpose, the coating film formed from the composition of the present invention and other films may be combined to form a composite film. For example, in an application to a passivation film for a semiconductor device or an interlayer dielectric film for a semiconductor device, an inorganic film may sometimes be formed as an under layer and/or an upper layer of the film formed from the composition of the present invention. Here, an inorganic film means a so-called PSG film or BPSG film having phosphorus and/or boron doped on a silicon oxide film, as the case requires, a silicon oxide film, a silicon nitride film or a silicon oxide nitride film.

By forming an inorganic film between the metal wiring and the film formed from the composition of the present invention, it is possible to prevent peeling of the metal wiring or to prevent downward diffusion of moisture which is likely to occur during curing when a coating film is formed from the composition of the present invention, whereby it is possible to prevent deterioration of the device properties. If a heat higher than 450° C. is applied, the metal wiring layer undergoes a property change. Accordingly, the inorganic film is required to be formed at a temperature not higher than 450° C.

Specifically, it is preferred to employ a film which can be formed by a chemical vapor deposition (CVD) method such as atmospheric pressure CVD or plasma CVD. Further, formation of an inorganic film as an upper layer, may be carried out after the coating film formed from the composition of the present invention is polished by a so-called etch back method or a CMP (chemical mechanical polishing) method.

When an inorganic film is formed as an upper layer, depending upon the composition of the inorganic film or the method of its formation, there will be a problem such that the adhesion to a coating film formed from the composition of the present invention is poor, or the coating film receives a damage such as film reduction during the formation of the inorganic film. To overcome such a problem, the following method (1) or (2) may, for example, be employed.

(1) A method in which the inorganic film is made to have a multilayered structure. When a silicon oxide film is formed by plasma CVD, depending upon the composition of the gas used, film reduction may occur. In such a case, an inorganic film which does not bring about film reduction, such a silicon nitride film or atmospheric pressure CVD-silicon oxide film, is firstly formed in a very thin thickness, and then using the thin film thereby formed, as a barrier layer, a silicon oxide film is formed thereon.

(2) The coating film formed from the composition of the present invention is firstly treated with energy rays to activate the surface, and then an inorganic film is formed thereon. This method may have an additional effect of improving the adhesion of the interface with the inorganic film. The treatment with energy rays may be treatment by means of an electromagnetic wave in a broad sense including light. Namely, it may, for example, be ultraviolet irradiation, laser beam irradiation, microwave irradiation or treatment by means of an electron beam such as electron beam irradiation, glow discharge treatment, corona discharge treatment or plasma treatment.

Among these treatments, preferred as a treating method suitable for a mass production of semiconductor devices may, for example, be ultraviolet irradiation, laser beam irradiation, corona discharge treatment or plasma treatment. Particularly preferred is plasma treatment, whereby the damage to semiconductor devices will be minimum.

An apparatus for such plasma treatment is not particularly limited so long as a desired gas can be introduced into the apparatus, and an electric field can be applied, and a commercially available barrel type or horizontal flat plate type plasma generation apparatus can suitably be used. A gas to be introduced to the plasma apparatus is not particularly limited so long as it is capable of effectively activating the surface. It may, for example, be argon, helium, nitrogen, oxygen or a gas mixture thereof. Further, a gas mixture of nitrogen and oxygen, and a nitrogen gas, may preferably be mentioned as gasses which are capable of effectively activating the surface of a coating film formed by the composition of the present invention and which is substantially free from bringing about film reduction.

In its application to a buffer coat film for a semiconductor device, a passivation film for a semiconductor device, an interlayer dielectric film for a semiconductor device, an α-ray shielding film for a semiconductor device or an interlayer dielectric film for a multi-layered circuit board, the coating film formed from the composition of the present invention may sometimes require fine processing. In such a case, the above-mentioned energy ray treatment, particularly the plasma treatment, is effective for preventing cissing at the time of coating a photoresist for photolithography. The fine processing method may be a known or well-known method such as a wet etching method or a dry etching method. Particularly preferred is a plasma dry etching method employing a fluorinated hydrocarbon type gas such as $CF_4$ or $C_2F_6$.

In the present invention, the semiconductor device may, for example, be a discrete semiconductor device, such as a diode, a transistor, a compound semiconductor, a thermistor, varistor or a thyristor; an integrated circuit (IC) device, such as a memory IC e.g. DRAM (dynamic random access memory), SRAM (static random access memory), EPROM (erasable programmable read only memory), mask ROM (mask read only memory), EEPROM (electrically erasable programmable read only memory) or a flash memory, a logic IC e.g. a micro processor unit, DSP (digital signal processor) or ASIC (application specific IC), or MMIC (monolithic microwave IC); a hybrid IC; or an optical device, such as a light emitting diode or a charge coupled device.

The coating film formed by the composition of the present invention is applied as a buffer coat film, a passivation film, an interlayer dielectric film or an α-ray shielding film for a semiconductor device, whereby it is possible to attain high performance in e.g. reducing the time of signal propagation delay of a device by virtue of excellent electrical properties such as a low dielectric constant and a high dielectric strength, and it is also possible to attain high reliability by virtue of excellent mechanical properties in a high temperature region.

In the present invention, the multi-layered circuit board includes a high density circuit board such as MCM. By applying the coating film formed from the composition of the present invention as an interlayer dielectric film, it is possible to attain the high performance in e.g. reducing the time of signal propagation delay and the high reliability, simultaneously, as in the above described case.

Now, the present invention will be described in further detail with reference to Examples. However, it should be understood that the present invention is by no means restricted by such specific Examples.

EXAMPLE 1

(Preparation Example)

35 g of perfluoro(butenylvinylether), 150 g of deionized water, 20 g of methanol and 90 mg of $((CH_3)_2CHOCOO)_2$ as a polymerization initiator, were charged into a pressure resistant glass autoclave having an internal capacity of 200 cc, and the interior was flushed three times with nitrogen, followed by suspension polymerization at 40° C. for 22 hours to obtain 28 g of a cyclic polymerization polymer (hereinafter referred to as polymer A). The intrinsic viscosity (η) of polymer A was 0.2 dl/g as measured at 30° C. in perfluoro(2-butyltetrahydrofuran). Further, polymer A was heat-treated in air at 300° C. for 3 hours and then immersed in water, to obtain a polymer having functional groups in its molecule (hereinafter referred to as polymer B). In the IR spectrum of polymer B, a peak attributable to a carboxyl group was confirmed, and the amount of carboxyl groups was 0.03 mmol/g polymer. Polymer B had a dielectric constant of 2.1 and a modulus of elasticity of at most 1 MPa at 200° C.

Further, polymer B was immersed in dichloropentafluoroethane/1-propanol in the presence of sodium borohydride and refluxed for 5 hours, followed by washing and drying to obtain a polymer having functional groups in its molecule (hereinafter referred to as polymer C). In the IR spectrum of polymer C, a peak attributable to a hydroxyl group was observed. Polymer C had a dielectric constant of 2.1 and a modulus of elasticity of at most 1 MPa at 200° C.

EXAMPLE 2

(Preparation Example)

40 g of perfluoro(butenylvinylether), 1.6 g of methyl perfluoro(5-oxa-6-heptenoate), 150 g of deionized water and 90 mg of $((CH_3)_2CHOCOO)_2$ as a polymerization initiator, were charged into a pressure resistant glass autoclave having an internal capacity of 200 cc, and the interior was flushed three times with nitrogen, followed by suspension polymerization at 40° C. for 24 hours to obtain 30 g of a polymer.

The intrinsic viscosity (η) of this polymer was 0.34 dl/g as measured at 30° C. in perfluoro(2-butyltetrahydrofuran). Further, methyl ester groups of this polymer were hydrolyzed by a well-known method to obtain a polymer having 0.12 mmol/g of carboxyl groups (hereinafter referred to as polymer D). Polymer D had a dielectric constant of 2.1 and a modulus of elasticity of at most 1 MPa at 200° C.

EXAMPLE 3

(Preparation Example)

Perfluoro(2,2-dimethyl-1,3-dioxole), perfluoro (butenylvinylether) and methyl perfluoro(5-oxa-6-heptenoate) were subjected to radical copolymerization to obtain a polymer having a glass transition temperature of 160° C. The intrinsic viscosity (η) of this polymer was 0.43 dl/g as measured at 30° C. in perfluoro(2-butyltetrahydrofuran). This polymer was hydrolyzed in the same manner as in Example 2 to obtain a polymer having carboxyl groups in an amount of 0.15 mmol/g polymer (hereinafter referred to as polymer E). Polymer E had a dielectric constant of 2.1 and a modulus of elasticity of at most 1 MPa at 200° C.

EXAMPLE 4

(Preparation Example)

Tetrafluoroethylene and methyl perfluoro(5-oxa-6-heptenoate) were subjected to bulk polymerization using $((CH_3)_2CHOCOO)_2$ as an initiator at 40° C. under 7.0 $kg/cm^2$ to obtain a copolymer, which was then hydrolyzed to obtain a polymer having carboxyl groups in an amount of 1.3 mmol/g polymer (hereinafter referred to as polymer F). Polymer F had a dielectric constant of 2.4 and a modulus of elasticity of at most 100 MPa at 200° C.

EXAMPLE 5

(Preparation Example)

In a reactor, tetramethoxysilane and $CF_3(CF_2)_5CH_2CH_2Si(OCH_3)_3$ were dissolved in methanol in a molar ratio of 1:0.5, and nitric acid and water were further added thereto. Then, the mixture was reacted at room temperature for 72 hours. Then, the reaction solution was passed through a column of an ion exchange resin to remove nitric acid. Then, the solvent was substituted by $CF_2CF_2CH_2OH$ to obtain a solution of a partially hydrolyzed condensate. The solid content concentration of this solution was adjusted to 10 wt % to obtain a solution (hereinafter referred to as solution U). The weight average molecular weight of this partially hydrolyzed condensate was 1,050 (as calculated as polystyrene obtained by GPC).

EXAMPLE 6

(Preparation Example)

In a reactor, tetramethoxysilane and methyltrimethoxysilane were dissolved in $CF_3(CF_2)_5CH_2CH_2OH$ in a molar ratio of 1:1, and nitric acid was further added thereto. Then, the mixture was reacted at 70° C. for for 5 hours. Then, the reaction solution was passed through a column of an ion exchange resin to remove nitric acid, to obtain a solution of a partially hydrolyzed condensate (hereinafter referred to as solution X). The solid content concentration of solution X was 15 wt %.

EXAMPLE 7

(Preparation Example)

A solution of a partially hydrolyzed condensate (hereinafter referred to as solution Y) was prepared in the same manner as in Example 5 except that as the solvent for reaction, $CF_3CF_2CH_2OH$ was used instead of $CF_3(CF_2)_5CH_2CH_2OH$. The solid content concentration of solution Y was 15 wt %.

EXAMPLE 8

(Preparation Example)

In a reactor, tetramethoxysilane and $CF_3(CF_2)_7CH_2CH_2Si(OCH_3)_3$ were dissolved in $CF_3CF_2CH_2OH$ in a molar ratio of 1:0.5, and nitric acid and water were further added thereto. Then, the mixture was reacted at room temperature for for 72 hours. Then, the reaction solution was passed through a column of an ion exchange resin to remove nitric acid, to obtain a solution of a partially hydrolyzed condensate (hereinafter referred to as solution Z). The solid content concentration of solution Z was 13 wt %.

EXAMPLES 9 to 21

(Examples of the Present Invention) and

EXAMPLES 22 and 23

(Comparative Examples)

Polymer A, B, C, D, E and F obtained in Examples 1 to 4 and solutions U, X, Y and Z of partially hydrolyzed condensates of alkoxysilanes obtained in Examples 5 to 8, and the compounds as identified in Table 1 were used to prepare solutions having compositions as identified in Table 2. Here, in Examples 12, 13 and 14, after the preparation of a solution, stirring was carried out at 40° C. for 3 hours to crosslink the polymer with the partially hydrolyzed condensate of alkoxysilanes via APMS.

In Table 2, the compositional ratio in the solvent is represented by a weight ratio, and the amounts of the condensate, MTES and APMS are represented by parts by weight per 100 parts by weight of the solid content polymer, and all of the compositions were prepared so that the polymer concentration became 3 wt %.

Then, with respect to each composition, the following evaluation (A) was carried out. On the other hand, a coating film was formed from the solution of the composition by a casting method, and the following evaluations (B) to (D) were carried out. The results are shown in Table 3. The baking was conducted under such a condition as 2 hours at 100° C., then 1 hour at 200° C. and then 1 hour at 350° C.

(A) Appearance of the solution: The appearance of the solution was visually examined.

(B) Appearance of the coating film: The appearance of the coating film was visually examined.

(C) Measurement for modulus of elasticity and measurement for linear expansion coefficient: By a TMA (thermal mechanical analysis) method, a modulus of elasticity at room temperature and at 200° C., and a linear expansion coefficient between room temperature and 100° C., were measured.

(D) Dielectric constant: The value at a frequency of 100 MHz was obtained by the measurement of the capacitance.

EXAMPLE 24

(Example of the Present Invention)

The solution of the composition obtained in Example 13 was coated by a spin coater and baked at 100° C. for 1 hour, then at 250° C. for 1 hour and then at 400° C. for 1 hour, to form a coating film having a thickness of 0.5 μm. In this manner, two silicon wafers were prepared. Then, on one wafer, an aluminum film having a thickness of 1 μm was formed by sputtering, and on the other wafer, a plasma CVD film was formed in the following manner. Firstly, a silicon nitride film was formed in a thickness of 50 nm by a gas mixture of monosilane, ammonia and nitrogen, and then a silicon oxide film having a thickness of 500 nm was formed by a gas mixture of monosilane and oxygen dinitride. Then, both wafers were baked at 400° C. for 30 minutes in a hydrogen atmosphere, whereby the resistance against cracking due to heat stress was examined by a metal microscope. The results are shown in Table 4.

EXAMPLE 25

(Example of the Present Invention)

The same evaluation as in Example 24 was carried out except that the solution of the composition was changed to the one obtained in Example 18. The results are shown in Table 4.

EXAMPLE 26

(Example of the Present Invention)

The same evaluation as in Example 24 was carried out except that the solution of the composition was changed to the one obtained in Example 20. The results are shown in Table 4.

EXAMPLE 27

(Comparative Example)

The same evaluation as in Example 24 was carried out except that the solution of the composition was changed to the one obtained in Example 22. The results are shown in Table 4.

TABLE 1

| Abbreviation | Chemical Name |
|---|---|
| FTBA | Perfluorotributylamine |
| TFOA | $CF_3(CF_2)_5CH_2CH_2OH$ |
| PFPA | $CF_3CF_2CH_2OH$ |
| ETOH | $CH_3CH_2OH$ |
| MTES | Methyltriethoxysilane |
| APMS | Aminophenyltrimethoxysilane |

TABLE 2

| Example No. | Type of polymer | Solvent Type | Solvent Compositional ratio | Condensate Type | Condensate Amount | MTES amount | APMS amount |
|---|---|---|---|---|---|---|---|
| 9 | B | FTBA/TFOA | 87/13 | X | 10 | 40 | 4 |
| 10 | C | FTBA/TFOA | 85/15 | X | 10 | 40 | 0 |
| 11 | D | FTBA/PFPA | 95/5 | U | 10 | 0 | 0 |
| 12 | D | FTBA/PFPA | 95/5 | U | 10 | 0 | 4 |
| 13 | D | FTBA/PFPA | 95/5 | U | 70 | 0 | 4 |
| 14 | D | FTBA/PFPA | 95/5 | U | 150 | 0 | 4 |
| 15 | D | FTBA/TFOA | 85/15 | X | 10 | 40 | 4 |
| 16 | D | FTBA/TFOA | 87/13 | X | 70 | 40 | 4 |
| 17 | D | FTBA/PFPA | 96/4 | Y | 10 | 0 | 4 |
| 18 | D | FTBA/PFPA | 98/2 | Z | 70 | 0 | 4 |
| 19 | E | FTBA/TFOA | 85/15 | X | 70 | 40 | 4 |
| 20 | F | ETOH/PFPA | 70/30 | Y | 70 | 40 | 9 |
| 21 | F | ETOH/PFPA | 70/30 | Y | 70 | 40 | 0 |
| 22 | B | FTBA | 100 | — | 0 | 0 | 4 |
| 23 | A | FTBA/TFOA | 85/15 | X | 10 | 40 | 4 |

TABLE 3

| Example No. | Appearance of the solution | Appearance of the coating film | Modulus of elasticity (MPa) Room temp. | Modulus of elasticity (MPa) 200° C. | Linear expansion coefficient (ppm/°C.) | Dielectric constant |
|---|---|---|---|---|---|---|
| 9 | Uniform | Uniform | 1200 | 310 | 61 | 2.2 |
| 10 | Uniform | Uniform | 1200 | 230 | — | 2.2 |
| 11 | Uniform | Uniform | 1200 | 350 | 52 | 2.1 |
| 12 | Uniform | Uniform | 1200 | 710 | 32 | 2.2 |
| 13 | Uniform | Uniform | 1300 | 1300 | 20 | 2.3 |
| 14 | Uniform | Uniform | 1400 | 1500 | 14 | 2.4 |
| 15 | Uniform | Uniform | 1200 | 540 | 58 | 2.2 |
| 16 | Uniform | Uniform | 1300 | 1100 | — | 2.4 |
| 17 | Uniform | Uniform | 1200 | 600 | — | 2.1 |
| 18 | Uniform | Uniform | 1400 | 1400 | 18 | 2.2 |
| 19 | Uniform | Uniform | 1100 | 1000 | 40 | 2.2 |
| 20 | Uniform | Uniform | 600 | 550 | 52 | 2.6 |
| 21 | Uniform | Uniform | 600 | 430 | 60 | — |
| 22 | Uniform | Uniform | 1200 | <1 | 74 | 2.1 |
| 23 | Phase separation | Not measurable as it was impossible to form a coating film. | | | | |

TABLE 4

| Example No. | Al film | CVD film |
|---|---|---|
| 24 | No cracks | No cracks |
| 25 | No cracks | No cracks |
| 26 | No cracks | No cracks |
| 27 | Cracks formed | Cracks formed |

By coating the composition of the present invention, the mechanical properties in a high temperature region will be remarkably improved as compared with usual resins having low dielectric constants, and it is possible to obtain a uniform coating film, and the reliability in the case exposed at high temperatures, will be substantially improved. Especially when it is applied to a semiconductor device or a multi-layered circuit board, it is possible to accomplish reduction of the time of signal propagation delay by virtue of its low dielectric constant, and it is sufficiently durable against heating in the production step and the packaging step, whereby the reliability will not be impaired.

What is claimed is:

1. A low dielectric resin composition consisting essentially of the following components (a) and (b), wherein the dielectric constant of a coating film formed by this composition is at most 3:

(a) a resin having functional groups in its molecule reactive with the following hydrolyzed condensate component (b) and being soluble in a solvent; and (b) a partially hydrolyzed condensate of alkoxysilanes of the formula $R^1_mR^2_nSi(OR^3)_{4-m-n}$, wherein each of $R^1$ and $R^2$, which may be the same or different, is a non-hydrolyzable group, $R^3$ is an alkyl group, and m and n are values of from 0 to 3 satisfying $0 \leqq m+n \leqq 3$.

2. The composition according to claim 1, wherein the modulus of elasticity of the coating film formed by the composition of claim 1, at a temperature of at least 200° C., is at least the modulus of elasticity of the resin (a).

3. The composition according to claim 1, wherein the proportion of the partially hydrolyzed condensate (b) is from 3 to 400 parts by weight, per 100 parts by weight of the resin (a).

4. The composition according to claim 1, wherein the dielectric constant of the resin (a) is at most 3.

5. The composition according to claim 1, wherein the functional groups of the resin (a) are hydroxyl groups or carboxyl groups.

6. The composition according to claim 1, wherein the proportion of the functional groups in the resin (a) is at least 1 μmol per g of the resin (a).

7. The composition according to claim 1, wherein the resin (a) is a fluorine resin having functional groups in its molecule and having a fluorine-containing aliphatic cyclic structure in its main chain.

8. The composition according to claim 7, wherein the fluorine resin having a fluorine-containing aliphatic cyclic structure in its main chain is a fluorine resin obtained by cyclic polymerization of a fluorine-containing monomer having at least two polymerizable double bonds, or a fluorine resin obtained by polymerizing a monomer having a fluorine-containing aliphatic cyclic structure.

9. The composition according to claim 1, wherein the resin (a) is a fluorine resin having functional groups in its molecule and having a fluorine-containing aliphatic structure in its main chain.

10. The composition according to claim 1, wherein the resin (a) is a fluorine resin soluble in an aprotic fluorine-containing solvent.

11. The composition according to claim 1, wherein the resin (a) is a fluorine resin soluble in a solvent mixture comprising an oxygen-containing hydrocarbon solvent and an aprotic fluorine-containing solvent.

12. The composition according to claim 1, wherein the partially hydrolyzed condensate (b) is at least one member selected from the group consisting of a partially hydrolyzed condensate of tetraalkoxysilanes, a partially hydrolyzed condensate of fluorine-containing alkoxysilanes and a partially hydrolyzed co-condensate of tetraalkoxysilanes and fluorine-containing alkoxysilanes.

13. An article having a coating film formed by the composition of claim 1.

14. The article of claim 13, which is a semiconductor device or a multi-layered circuit board.

15. The article according to claim 13, wherein the coating film is a buffer coat film of a semiconductor device, a passivation film of a semiconductor device, an interlayer dielectric film of a semiconductor device, an α-ray shielding film of a semiconductor device, or an interlayer dielectric film of a multi-layered circuit board.

16. A low dielectric resin composition consisting essentially of:

(a) a resin having functional groups in its molecule which are reactive with partially hydrolyzed condensate (b) or coupling agent (c), said resin being soluble in a solvent;

(b) a partially hydrolyzed condensate of alkoxysilanes of the formula $R^1_m R^2_n Si(OR^3)_{4-m-n}$, wherein each of $R^1$ and R2, which may be the same or different, is a non-hydrolyzable group, $R^3$ is an alkyl group, and m and n are values of from 0–3 satisfying $0 \leqq m+n \leqq 3$; and (c) a coupling agent, wherein the dielectric constant of a coated film formed from the composition is at most 3.

17. The composition according to claim 16, which contains a reaction product obtained by crosslinking of the resin (a) and the partially hydrolyzed condensate (b) by means of a coupling agent (c).

* * * * *